US012023589B2

(12) United States Patent
Han et al.

(10) Patent No.: US 12,023,589 B2
(45) Date of Patent: *Jul. 2, 2024

(54) OBJECT CONTROL METHOD AND DEVICE, STORAGE MEDIUM, AND ELECTRONIC DEVICE

(71) Applicant: Tencent Technology (Shenzhen) Company Limited, Shenzhen (CN)

(72) Inventors: Chuang Han, Shenzhen (CN); Jie Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,308

(22) Filed: Apr. 5, 2023

(65) Prior Publication Data

US 2023/0241504 A1 Aug. 3, 2023

Related U.S. Application Data

(63) Continuation of application No. 16/898,195, filed on Jun. 10, 2020, now Pat. No. 11,648,475, which is a (Continued)

(30) Foreign Application Priority Data

Mar. 23, 2018 (CN) .......................... 201810246273.2

(51) Int. Cl.
*A63F 13/56* (2014.01)
*A63F 13/2145* (2014.01)
(Continued)

(52) U.S. Cl.
CPC .......... *A63F 13/56* (2014.09); *A63F 13/2145* (2014.09); *A63F 13/426* (2014.09); *A63F 13/58* (2014.09)

(58) Field of Classification Search
CPC .. A63F 13/214; A63F 13/2145; A63F 13/426; A63F 13/56; A63F 13/58
See application file for complete search history.

(56) References Cited

U.S. PATENT DOCUMENTS 6,520,858 B2 * 2/2003 Matsui ................. A63F 13/807
463/43
7,677,977 B2 * 3/2010 Maehiro ................ A63F 13/00
273/317.1
(Continued)

FOREIGN PATENT DOCUMENTS

CN 105521603 A 4/2016
CN 102693362 B 5/2016
(Continued)

OTHER PUBLICATIONS

Tencent Technology, ISRWO, PCT/CN2019/078225, May 28, 2019, 6 pgs.
(Continued)

*Primary Examiner* — Chase E Leichliter
(74) *Attorney, Agent, or Firm* — Morgan, Lewis & Bockius LLP

(57) ABSTRACT

Embodiments of this application disclose an object control method and device, a storage medium, and an electronic device. The method includes: detecting a first operation triggered in a client, the client displaying a virtual scene, and the first operation being used for instructing a target object in the virtual scene to move from one side of a target obstacle to the other side of the target obstacle; determining a target action to be performed by the target object, the target action being determined according to attributes of the target obstacle, and the target action being a crossing type or climbing type action performed by the target object to move from one side of the target obstacle to the other side of the target obstacle; and controlling, in the virtual scene, the (Continued)

target object to perform the target action. The embodiments of this application resolve a technical problem of an undiversified operation manner in an encounter of an obstacle in the related art.

20 Claims, 10 Drawing Sheets

Related U.S. Application Data continuation of application No. PCT/CN2019/078225, filed on Mar. 15, 2019.

(51) Int. Cl.
*A63F 13/426* (2014.01)
*A63F 13/58* (2014.01)

(56) References Cited

U.S. PATENT DOCUMENTS

| | | | | |
|---|---|---|---|---|
| 11,648,475 | B2* | 5/2023 | Han | A63F 13/5375 463/31 |
| 2001/0041617 | A1* | 11/2001 | Matsui | A63F 13/47 463/43 |
| 2002/0115483 | A1* | 8/2002 | Fujiwara | A63F 13/45 463/7 |
| 2002/0155889 | A1* | 10/2002 | Miyamoto | A63F 13/577 463/32 |
| 2005/0071306 | A1* | 3/2005 | Kruszewski | A63F 13/10 345/473 |
| 2005/0221879 | A1* | 10/2005 | Tsuchiya | A63F 13/58 463/8 |
| 2006/0094502 | A1* | 5/2006 | Katayama | A63F 13/2145 463/31 |
| 2007/0265081 | A1* | 11/2007 | Shimura | A63F 13/426 463/37 |
| 2009/0305758 | A1* | 12/2009 | Nomura | A63F 13/45 463/43 |
| 2011/0304651 | A1* | 12/2011 | Shimura | A63F 13/2145 345/661 |
| 2012/0157196 | A1* | 6/2012 | Otani | A63F 13/26 463/43 |
| 2015/0273333 | A1* | 10/2015 | Ciszewski | A63F 13/47 463/31 |
| 2016/0217323 | A1* | 7/2016 | Takeuchi | G06N 7/01 |
| 2017/0001121 | A1* | 1/2017 | Shimoda | A63F 13/69 |
| 2018/0056183 | A1* | 3/2018 | Tezuka | A63F 13/56 |
| 2018/0056188 | A1* | 3/2018 | Miyamoto | A63F 13/525 |
| 2018/0078857 | A1* | 3/2018 | Kim | A63F 13/44 |
| 2018/0154264 | A1* | 6/2018 | Sato | A63F 13/80 |
| 2018/0207524 | A1* | 7/2018 | Babieno | A63F 13/25 |
| 2018/0318705 | A1* | 11/2018 | Moberg | A63F 13/5255 |
| 2020/0086216 | A1* | 3/2020 | Shimomoto | A63F 13/58 |
| 2020/0298119 | A1* | 9/2020 | Han | A63F 13/426 |
| 2023/0241504 | A1* | 8/2023 | Han | A63F 13/2145 463/31 |

FOREIGN PATENT DOCUMENTS

| | | |
|---|---|---|
| CN | 106201266 A | 12/2016 |
| CN | 108635853 A | 10/2018 |
| JP | 2000235655 A | 8/2000 |

OTHER PUBLICATIONS

Tencent Technology, IPRP, PCT/CN2019/078225, Sep. 29, 2020, 5 pgs.

* cited by examiner

OBJECT CONTROL METHOD AND DEVICE, STORAGE MEDIUM, AND ELECTRONIC DEVICE

CROSS REFERENCE TO RELATED APPLICATIONS

This application is a continuation application of U.S. application Ser. No. 16/898,195, entitled "OBJECT CONTROL METHOD, DEVICE, STORAGE MEDIUM AND ELECTRONIC DEVICE" filed on Jun. 10, 2020, which is a continuation application of PCT Application No. PCT/CN2019/078225, entitled "OBJECT CONTROL METHOD, DEVICE, STORAGE MEDIUM AND ELECTRONIC DEVICE" filed on Mar. 15, 2019, which claims priority to Chinese Patent Application No. 201810246273.2, entitled "OBJECT CONTROL METHOD AND DEVICE, STORAGE MEDIUM, AND ELECTRONIC DEVICE" filed with the Chinese National Intellectual Property Administration on Mar. 23, 2018, all of which are incorporated by reference in their entirety.

FIELD OF THE TECHNOLOGY

Embodiments of this application relate to the field of the Internet, and specifically, to an object control method and device, a storage medium, and an electronic device.

BACKGROUND OF THE DISCLOSURE

With the development of multimedia technologies and the popularization of wireless networks, people's entertainment activities become increasingly rich, for example, connecting to a network to play a game by using a handheld media device, and playing a standalone game or an online game by using a computer; and types of games are diversified, such as a barrage shooting game, an adventure game, a simulation game, a role-playing game, a casual card game, and other games.

In most types of games, for example, in a shooting game, an obstacle may be encountered during a game process. Currently, a player can avoid the obstacle only in a single manner of bypassing the obstacle. This game operation manner is undiversified, and degrades user experience.

For the foregoing problem, currently no effective solution has been proposed.

SUMMARY

Embodiments of this application provide an object control method and device, a storage medium, and an electronic device, to at least resolve a technical problem of an undiversified operation manner in an encounter of an obstacle in the related art.

According to an aspect of the embodiments of this application, an object control method is performed at an electronic device having one or more processors and memory storing instructions to be executed by the one or more processors. The method includes: displaying a virtual scene using a client running at the electronic device; detecting a first operation triggered in the client, and the first operation being used for instructing a target object in the virtual scene to move from one side of a target obstacle to the other side of the target obstacle; determining a target action to be performed by the target object, the target action being determined according to attributes of the target obstacle, and the target action being a crossing type or climbing type action performed by the target object to move from one side of the target obstacle to the other side of the target obstacle; and controlling, in the virtual scene, the target object to perform the target action.

According to another aspect of the embodiments of this application, an object control device is further provided. The device includes one or more processors and one or more memories storing program units. The program units are executed by the processor and include: a detection unit, configured to detect a first operation triggered in a client, the client displaying a virtual scene, and the first operation being used for instructing a target object in the virtual scene to move from one side of a target obstacle to the other side of the target obstacle; a determining unit, configured to determine a target action to be performed by the target object, the target action being determined according to attributes of the target obstacle, and the target action being a crossing type or climbing type action performed by the target object to move from one side of the target obstacle to the other side of the target obstacle; and a performing unit, configured to control, in the virtual scene, the target object to perform the target action.

According to another aspect of the embodiments of this application, a non-transitory computer readable storage medium is further provided. The storage medium includes a plurality of programs, the program performing the foregoing method when executed by a processor of an electronic device.

According to another aspect of the embodiments of this application, an electronic device is further provided. The electronic device includes a memory, a processor, and a computer program stored on the memory and capable of being executed on the processor, the processor performing the foregoing method by using the computer program.

In the embodiments of this application, a first operation triggered in a client is detected, the client displaying a virtual scene, and the first operation being used for instructing a target object in the virtual scene to move from one side of a target obstacle to the other side of the target obstacle; a target action to be performed by the target object is determined, the target action being determined according to attributes of the target obstacle, and the target action being a crossing type or climbing type action performed by the target object to move from one side of the target obstacle to the other side of the target obstacle; and the target object is controlled in the virtual scene to perform the target action. In other words, in the embodiments of this application, a plurality of operation manners for getting over an obstacle are provided in a virtual scene, and a technical problem of an undiversified operation manner in an encounter of an obstacle in the related art can be resolved, thereby achieving a technical effect of enriching operations in an encounter of an obstacle.

BRIEF DESCRIPTION OF THE DRAWINGS

The accompanying drawings described herein are used for providing a further understanding of the embodiments of this application, and constitute a part of the embodiments of this application. Schematic embodiments of this application and descriptions thereof are used for explaining this application, and do not constitute an improper limitation to this application. In the accompanying drawings.

DESCRIPTION OF EMBODIMENTS

To make a person skilled in the art understand solutions of the embodiments of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of the embodiments of this application.

The terms such as "first" and "second" in the specification, claims, and the accompanying drawings of this application are intended to distinguish between similar objects rather than necessarily describe a particular sequence or a chronological order. It is to be understood that the data termed in such a way are interchangeable in proper circumstances so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

First, some nouns or terms that appear during descriptions of the embodiments of this application are applicable to the following explanations:

A 3D game is a three-dimensional electronic game manufactured based on three-dimensional computer patterns, including, but not limited to, a multiplayer online network 3D game and a single-player 3D game played by a single person, and may be implemented based on a virtual reality game system established by a 3D game system. 3D games can be generally applied to platforms, and include 3D games on a game console platform, a mobile phone game platform, and a PC side game platform.

First-person shooting game (FPS): an FPS belongs to a branch of action games (ACTs); and a first-person perspective shooting game, as the name suggests, is to perform a shooting game from a subjective perspective of a player.

According to an aspect of the embodiments of this application, a method embodiment of an object control method is provided.

Figure 1:
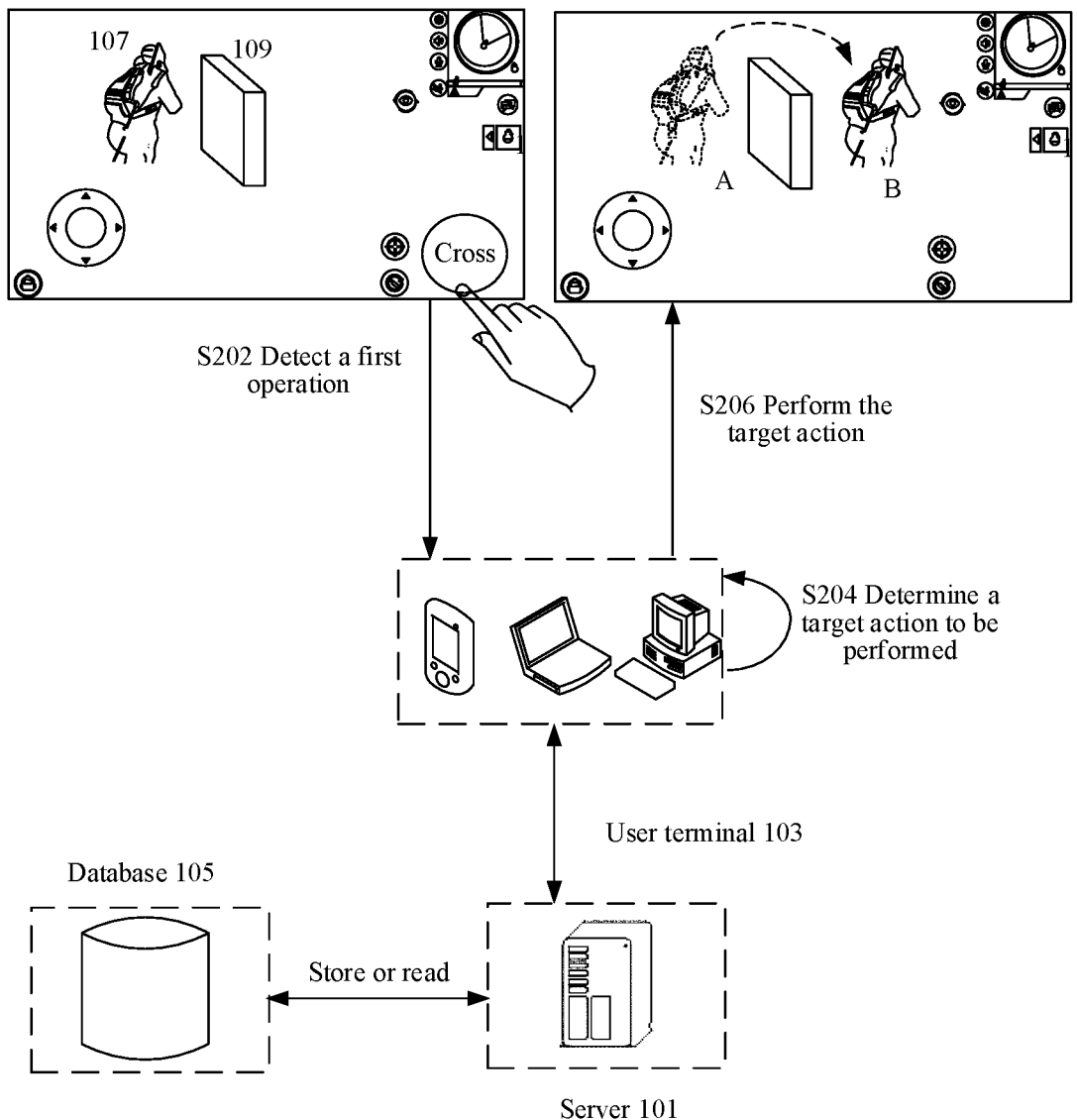
FIG. 1 is a schematic diagram of a hardware environment of an object control method according to an embodiment of this application.
Figure 2:
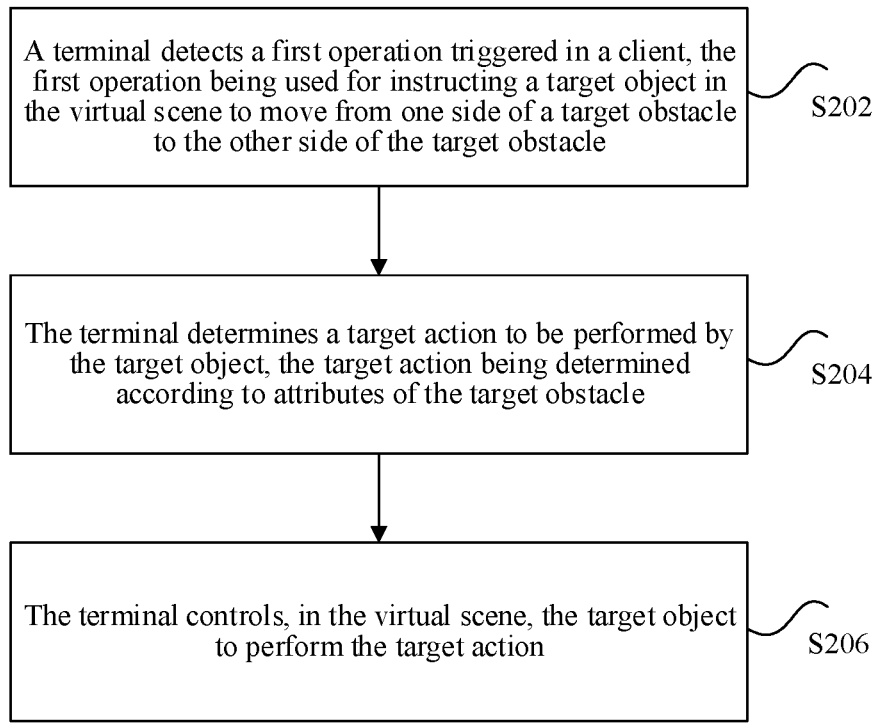
FIG. 2 is a flowchart of an optional object control method according to this embodiment of this application.

Optionally, in this embodiment, the object control method may be applied to a hardware environment formed by a server 101 and a terminal 103 shown in FIG. 1. As shown in FIG. 1, the server 101 is connected to the terminal 103 through a network, and may be configured to provide services (such as a game service and an application service) to a terminal or a client installed on a terminal. A database 105 may be set on the server or independent from the server, and is configured to provide a data storage service to the server 101. The network includes but is not limited to: a wide area network, a metropolitan area network, or a local area network. The terminal 103 is not limited to: a PC, a mobile phone, a tablet computer, and the like. FIG. 2 is a flowchart of an optional object control method according to an embodiment of this application. As shown in FIG. 2, the method may include the following steps:

Step S202: A terminal detects a first operation triggered in a client, the client displaying a virtual scene, and the first operation being used for instructing a target object (107) in the virtual scene to move from one side A of a target obstacle (109) to the other side B of the target obstacle. The client may be configured to operate an object in the virtual scene.

The virtual scene is a scene of a target application in which an obstacle is formed, such as a game application, a military simulation application, or a social application. For unification of descriptions, the descriptions are provided subsequently by using the game application as an example. Game types of the game application include, but are not limited to a barrage game, a shooting game, an adventure game, a casual game, a multiplayer online battle arena game, and the like. The first client is a client formed after the applications are installed on a device such as a mobile terminal or a PC.

The first operation may be an operation directly triggering the target object to get over the obstacle, such as an operation for a "crossing" or "climbing" button on the client, or an operation indirectly triggering the target object to get over the obstacle, such as an operation for a "running" button, a "walking" button, or a "creeping forward" button on the client. During a forwarding process triggered by these operations, an encountered obstacle can be automatically got over.

Step S204: The terminal determines a target action to be performed by the target object, the target action being determined according to attributes of the target obstacle, and the target action being a crossing type or climbing type action performed by the target object to move from one side of the target obstacle to the other side of the target obstacle.

There are a plurality of actions that may be used by the target object for getting over the obstacle. These actions belong to two types, such as a crossing type or climbing type action. The target action is determined according to the attributes of the target obstacle. In other words, if current attribute values of the attributes of the target obstacle are different, used target actions may be different.

The crossing is that: scanning detection is performed on attributes of the obstacle, for example, settings on an assistant determining box, so that when approaching the obstacle, the player can reach the other side of the obstacle by clicking a jump button to trigger a crossing action.

The climbing is that: scanning detection is performed on attributes of the obstacle, for example, settings on the assistant determining box, so that when approaching the obstacle, the player can reach an upper surface of the obstacle, or even stand on an upper surface of the obstacle through climbing by clicking a climbing button to trigger a climbing action.

Figure 3:
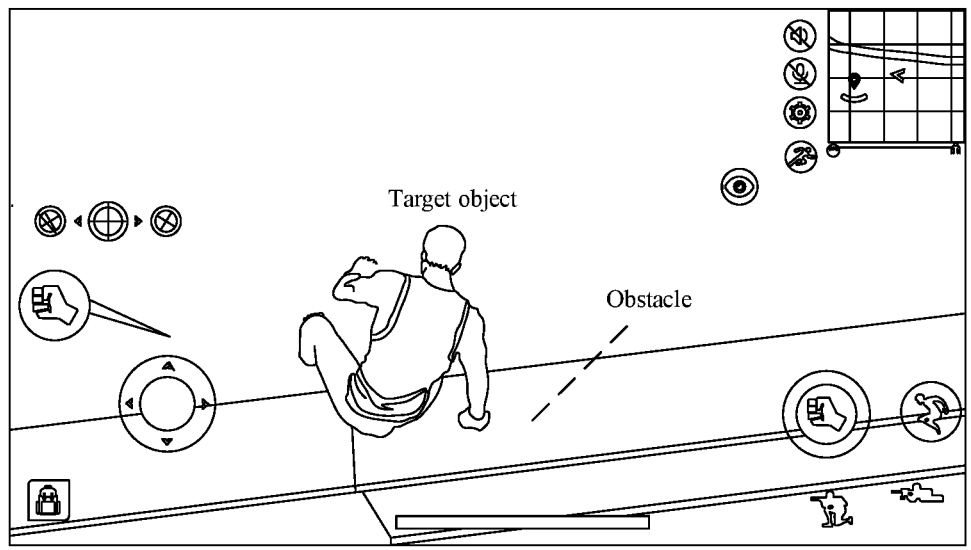
FIG. 3 is a schematic diagram of an optional game interface according to an embodiment of this application.

Step S206: The terminal controls, in the virtual scene, the target object to perform the target action, as shown in FIG. 3.

Step S206 is only used for representing that the target object is controlled to perform the target action, and whether the performing succeeds, that is, whether the target object succeeds in moving from one side of the target obstacle to the other side of the target obstacle is not limited in this embodiment of this application.

In the foregoing embodiment, descriptions are provided by using an example in which the object control method in this embodiment of this application is performed by the terminal 103. The method in this embodiment of this application may also be performed by the server 101, or may be performed by the server 101 and the terminal 103 together. When the terminal 103 performs the object control method in this embodiment of this application, the method may also be performed by a client installed in the terminal 103.

Through steps S202 to S208, when the first operation triggered in the client is detected, the action to be performed by the target object, that is, the crossing type or climbing type action performed to move from one side of the target obstacle to the other side of the target obstacle, is determined according to the attributes of the target obstacle; and then the target object is controlled in the virtual scene to perform the target action. In other words, in this embodiment of this application, a plurality of operation manners for getting over an obstacle are provided in a virtual scene, and a technical problem of an undiversified operation manner in an encounter of an obstacle in the related art can be resolved, thereby achieving a technical effect of enriching operations in an encounter of an obstacle.

In the technical solution in this embodiment of this application, in a 3D game scene, a role may perform two actions including crossing and climbing. When crossing and climbing are satisfied, an action that the player intends to perform is selected by using a branch system (that is, when crossing and climbing conditions are simultaneously met, a system triggering crossing or climbing is dynamically determined based on determining on an action of a player and the scene). Crossing and climbing actions are dynamically selected and adjusted according to conditions such as a player status, obstacle information, and an assistant determining body, and objective attributes of an obstacle and the assistant determining body are set, so that an objective of getting over the obstacle or standing on the obstacle by using the action can be achieved, and an operation that the player intends to trigger can be dynamically determined and selected. For ease of further understanding the technical solution in this embodiment of this application, this embodiment of this application is further described in detail below with reference to the steps in FIG. 2:

In the technical solution provided in step S202, during a process in which the player manipulates the target object in the virtual scene by using the client, if a target obstacle is encountered in the virtual scene, and in a case that the client determines that the target obstacle is allowed to be crossed or climbed, an identifier used for triggering the first operation is displayed in the client, and the player may trigger the first operation by clicking the identifier. In this case, the terminal may detect the first operation triggered in the client, the first operation being used by the player for instructing the target object in the virtual scene to move from one side of the target obstacle to the other side of the target obstacle.

In the embodiment provided in step S202, a status of the obstacle may be configured for all objects in the virtual scene. In other words, if the obstacle is configured to be allowed to be got over, all the objects in the virtual scene can get over the obstacle; and if the obstacle is configured to not be allowed to be got over, all the objects in the virtual scene cannot get over the obstacle. For different objects in the virtual scene, statuses of the obstacle are different. For example, the statuses of the obstacle may be different according to different statuses of the object. For example, an obstacle can be got over by an object whose height reaches 1.8 m; otherwise, the obstacle cannot be got over. For another example, an obstacle can be got over by an object whose capability value reaches a threshold; otherwise the obstacle cannot be got over.

Optionally, determining whether the obstacle is allowed to be got over (including being crossed or climbed) may include:

In a first step, a position of the target object (that is, a role of the player) is determined by using the assistant determining body.

Figure 4:
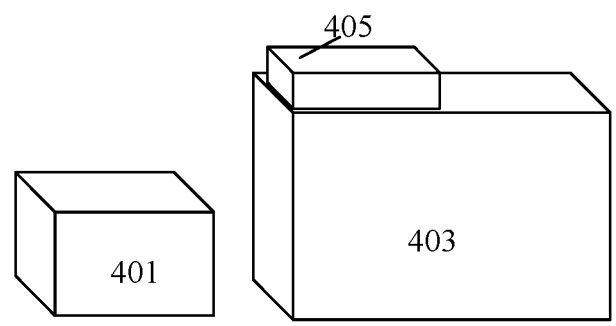
FIG. 4 is a schematic diagram of another optional game interface according to an embodiment of this application.

An assistant determining body 401 may be first preset before an item (that is, an obstacle 403) needing to be crossed. As shown in FIG. 4, only after a character (that is, the target object) enters the assistant determining body, a determining stage of a climbing and crossing system can be triggered. Based on this manner, screening and layout can be performed on all obstacles that can be crossed and climbed, and advantages of a targeted test include: first, reducing a risk in losing control of the system and occurrence of abnormality; and second, enabling obstacles that can be climbed and crossed to be more proper.

Optionally, when a special obstacle exists, required extra information is recorded in a class attribute of the assistant determining body, and is used for indicating whether the obstacle can be crossed or climbed.

The assistant determining body is equivalent to a target area. The area may be any area around the obstacle 403, and even may be an annular area around the obstacle 403.

Optionally, in a second step, when a condition is met, that is, after the target object enters into the assistant determining body, whether a prohibition determining body 405 exists on the top of the obstacle can be determined. If the prohibition determining body 405 exists, the climbing and crossing system is not triggered; and if no prohibition determining body 405 exists, the climbing and crossing system is allowed to be triggered to enter a further determining stage.

A third step is the determining stage of the climbing and crossing system.

The third step may be performed after the first step.

That is, in a case that the target object is located in a target area in the virtual scene, configuration information of the obstacle is obtained, and distances between points in the target area and the obstacle are within a target threshold (such as 1 m, 50 cm, or 10 cm). In a case that the configuration information indicates that the obstacle is allowed to be crossed or climbed, it is determined that the obstacle is allowed to be crossed or climbed; and in a case that the configuration information indicates that the obstacle is not allowed to be crossed or climbed, it is determined that the obstacle is not allowed to be crossed or climbed.

The third step may also be performed after the first step and the second step.

That is, in a case that the target object is located in the target area in the virtual scene and no prohibition determining body exists on the top of the obstacle, configuration information of the obstacle is obtained, and distances between points in the target area and the obstacle are within the target threshold. In a case that the configuration information indicates that the obstacle is allowed to be crossed or climbed, it is determined that the obstacle is allowed to be crossed or climbed; and in a case that the configuration information indicates that the obstacle is not allowed to be crossed or climbed, it is determined that the obstacle is not allowed to be crossed or climbed.

In the technical solution provided in step S204, in the determining stage of the climbing and crossing system, the terminal selects a target action to be performed by the target object, the target action being determined according to attributes of the target obstacle, and the target action being a crossing type or climbing type action performed by the target object to move from one side of the target obstacle to the other side of the target obstacle.

In this embodiment of this application, when the terminal selects the target action to be performed by the target object, at least the attributes of the target obstacle need to be considered. In other words, the terminal selects the target action from an action set at least according to the attributes of the target obstacle. The attributes may be a height, a width, a thickness, and the like.

In an optional embodiment, that the terminal selects the target action from an action set at least according to the attributes of the target obstacle may be only the attributes of the target obstacle being considered. For example, when the height of the target obstacle is greater than a threshold, the type of the to-be-performed action is determined as the climbing type, and a default climbing action may be selected or a climbing action may be randomly selected; and when the height of the target obstacle is not greater than the threshold, the type of the to-be-performed action is determined as the crossing type, and a default crossing action may be selected or a crossing action may be randomly selected.

In another optional embodiment, that the terminal selects the target action from an action set at least according to the attributes of the target obstacle may alternatively be the attributes of the target obstacle and attributes of the target object being considered. In other words, the terminal selects the target action from the corresponding action set according to the attributes of the target obstacle and the attributes of the target object. An optional implementation includes the following two steps:

In a first step, the terminal searches a plurality of sets for an action set matching the attributes of the target obstacle.

Figure 5:
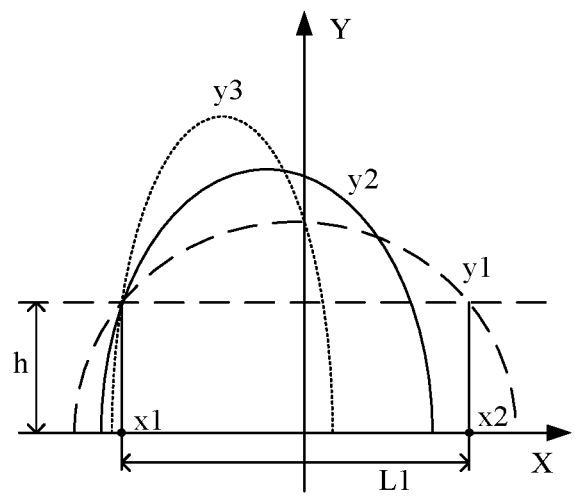
FIG. 5 is a schematic diagram of an optional obstacle according to an embodiment of this application.

Optionally, the terminal may search the plurality of sets for an action set matching the height and the thickness of the target obstacle. An optional implementation is as follows:

Before the plurality of sets are searched for the action set matching the attributes of the target obstacle, a target parabola is determined according to at least one of a speed v, inertia m and an orientation of the target object. For the same object, the inertia mass m basically remains unchanged. Therefore, attributes affecting the parabola of the target object mainly are the speed v and an orientation of the speed. For example, in a case that speeds v are the same, and orientations of the speeds are different, formed parabolas are not completely the same. As shown in FIG. 5, corresponding parabolas y1, y2, and y3 may be determined according to initial speeds, inertia mass, and orientations of the speeds.

The obtained speed v may be a current speed of the target object. In other words, the parabola may be calculated according to the speed v and the like in real time. The speed v may also be an ideal speed (for example, a set maximum speed) of the target object, and the orientation is an optimal orientation (that is, a farthest orientation that can be jumped toward in a case of a height h of a current obstacle), for example, the target parabola y1 in FIG. 5.

Figure 6:
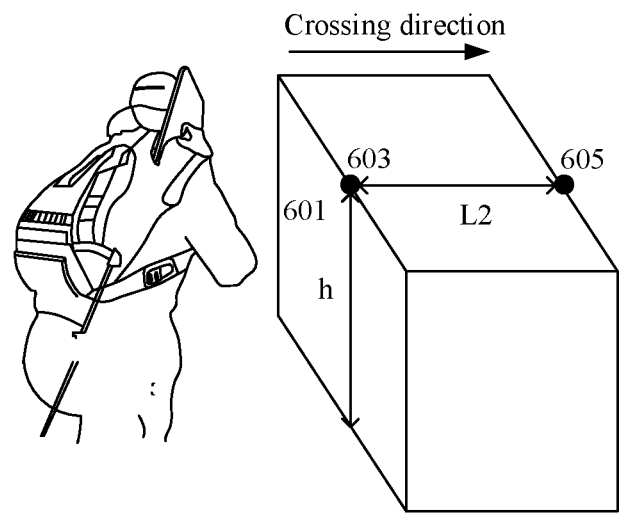
FIG. 6 is a schematic diagram of another optional obstacle according to an embodiment of this application.

After the target parabola is determined, when the plurality of sets are searched for the action set matching the attributes of the target obstacle, a thickness between a first point on the target obstacle and a second point on the target obstacle may be first obtained. As shown in FIG. 6, when the target object faces a surface 601 of the obstacle, the first point 603 is a point that is on the surface 601 and passed through by the target object when the target object starts to get over the target obstacle by using the crossing type action, and the second point 605 is a point that is located on a surface opposite to the surface 601 and passed through by the target object when the target object gets over the target obstacle by using the crossing type action.

If the obstacle is a regular object, the first point and the second point may have the same heights. As shown in FIG. 5, a distance L1 between a third point x1 and a fourth point x2 on the target parabola is then obtained. The third point is a point that is on a rise stage of the target parabola and that has the same height as the first point; the fourth point is a point that is on a fall stage of the target parabola and that has the same height as the second point; and the target parabola is a parabola that is formed in a case that the target object gets over the obstacle by using the crossing type action.

The distance L1 is a longest distance that the target object can cross under the height h. In a case that a thickness L2 between the first point and the second point is not greater than the distance between the third point and the fourth point, in other words, when the target object can cross the obstacle, the plurality of sets are searched for an action set in which types of included actions are the crossing type; and in a case that the thickness between the first point and the second point is greater than the distance between the third point and the fourth point, in other words, when the longest distance that the target object can cross cannot reach the thickness of the obstacle, the plurality of sets are searched for an action set in which types of included actions are the climbing type.

In a second step, the action set is searched for the target action matching the attributes of the target object.

Optionally, when the action set is searched for the target action matching the attributes of the target object, attributes such as the speed, the inertia, and the orientation of the target object may be considered. In other words, the terminal may search the action set for a target action matching the speed (a current speed), the inertia, and the orientation of the target object. For the selected target action, an angle between the target action and the obstacle is mainly considered. If amplitudes of the target action are different, efficiency using corresponding speeds is different. For example, if the target action is walking to cross over, impact from the current speed of the target object on whether the action is successfully performed is relatively small; and if the target action is running to cross over, the speed, an impulse of the speed, and a trajectory formed by the orientation (similar to FIG. 5) need to be considered. Therefore, different actions herein are associated with attributes such as the current speed, the inertia, and the orientation of the target object.

Optionally, when the terminal searches the action set for the target action matching the attributes of the target object, a distance between the target object and the target obstacle and the height of the target obstacle may also be only considered, and the target action is found from the action set according to the distance between the target object and the target obstacle and the height of the target obstacle. Each action in the action set is configured with a distance interval and a height interval; the distance between the target object and the target obstacle is within the distance interval configured for the target action; and the height of the target obstacle is within the height interval configured for the target action. FIG. 7 to FIG. 10 describe 4 optional actions in the action set.

Figure 7:
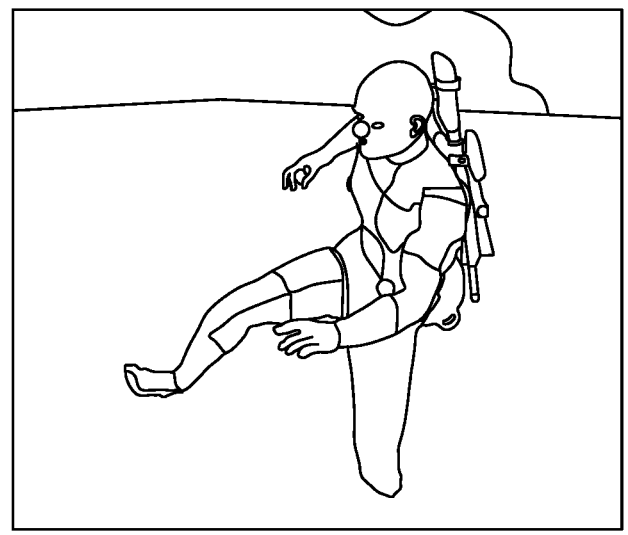
FIG. 7 is a schematic diagram of still another optional game interface according to an embodiment of this application.

For an action 1 shown in FIG. 7, use conditions include: the height of the obstacle is within a value range [x1, x2]; and a distance between the role (namely, the target object) and a wall surface is within a value range [y1, y2], where x1<x2, and y1<y2.

Figure 8:
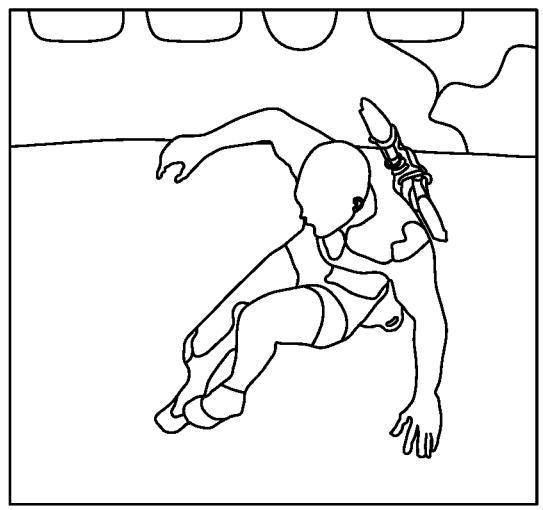
FIG. 8 is a schematic diagram of still another optional game interface according to an embodiment of this application.

For an action 2 shown in FIG. 8, use conditions include: the height of the obstacle is within a value range [x3, x4]; and the distance between the role and the wall surface is within a value range [y3, y4], where x3<x4, and y3<y4.

Optionally, before the action 2 is performed, a size of an upper space may also be detected during window crossing. When a length being within a value range [m1, m2] and a width being within a value range [n1, n2] are satisfied, the action 2 is performed, where m1<m2, and n1<n2.

Figure 9:
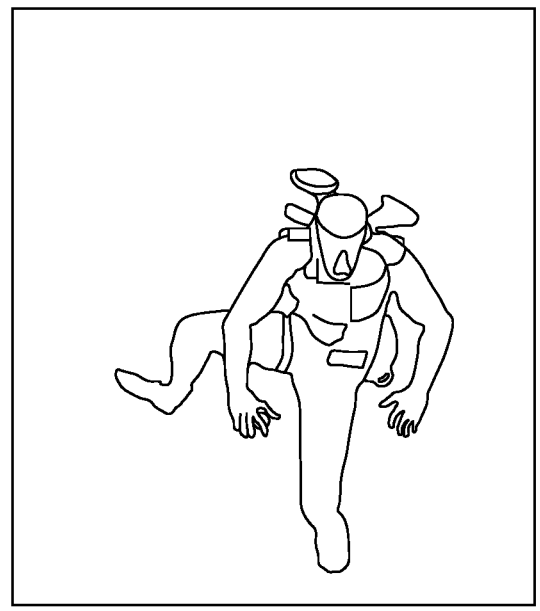
FIG. 9 is a schematic diagram of still another optional game interface according to an embodiment of this application.

For an action 3 shown in FIG. 9, use conditions include: the height of the obstacle is within a value range [x5, x6]; and the distance between the role and the wall surface is within a value range [y5, y6], where x5<x6, and y5<y6.

Figure 10:
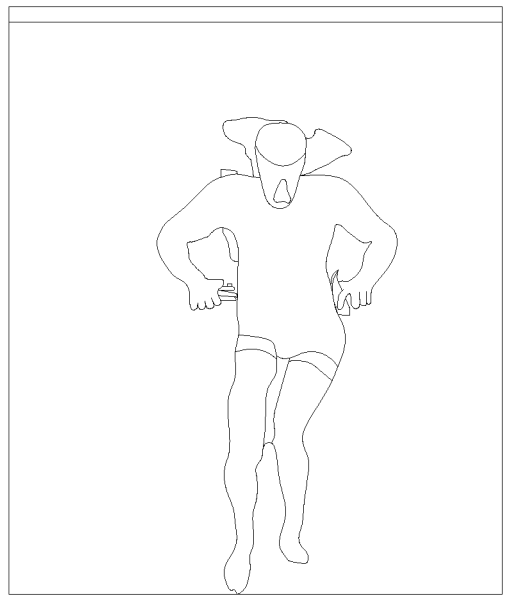
FIG. 10 is a schematic diagram of still another optional game interface according to an embodiment of this application.

For an action 4 shown in FIG. 10, use conditions include: the height of the obstacle is within a value range [x7, x8]; and the distance between the role and the wall surface is within a value range [y7, y8], where x7<x8, and y7<y8.

Optionally, before the action 4 is performed, a size of an upper space may also be additionally detected during window crossing. A length being within a value range [m3, m4] and a width being within a value range [n3, n4] are satisfied, where m3<m4, and n3<n4.

x1 to x8, y1 to y8, m1 to m4, and n1 to n4 are values that are set by using a standard unit of a game engine of an unreal engine; and value ranges under different actions may be irrelevant.

In the foregoing embodiment, the terminal may obtain attribute information such as the height, the thickness, and the width of the obstacle, and whether crossing and climbing conditions are met is determined according to the height and the thickness of the obstacle. If the conditions are met, actions meeting the conditions are selected to form an action set A, and a corresponding action is finally screened out from the action set A according to attributes such as a current forwarding speed, inertia, and a character orientation of the role.

In a branch system, crossing or climbing may be selected according to a status, inertia, and an angle of an upper-lower orientation of a lens (that is, an included angle between the target object and a plane on which the obstacle that directly faces the target object is located). During operation setting, it may be set that a single click triggers crossing by default, and double clicks trigger operations such as climbing by default.

In the technical solution provided in step S206, the terminal controls, in the virtual scene, the target object to perform the target action.

Optionally, in a case that the obstacle is configured to be allowed to be got over, a first picture is displayed on the client, the first picture being used for representing that the target object gets over the obstacle by using the target action, and the target action being an action determined according to a current status of the target object; and in a case that the obstacle is configured to not be allowed to be got over, a second picture is displayed on the client, the second picture being used for representing that the obstacle is not allowed to be got over.

The first picture is a picture representing a process in which the target object gets over the obstacle by using the target action; and the second picture may be prompt information, such as words or an identifier presenting semantics of "the obstacle cannot be got over" in the picture, or may be picture information, such as playing a picture in which a getting-over action of the target object stops as soon as the getting-over action is in contact with the obstacle. The presentation may be dynamic or static (a form of a single-frame picture) presentation. If the first picture or the second picture is played in a form of a multi-frame picture, the presentation is dynamic presentation; and if the first picture or the second picture is played in a form of a single-frame picture, the presentation is static presentation.

Optionally, the controlling, in the virtual scene, the target object to perform the target action may include: controlling, in the virtual scene, the target object to perform the crossing type action, and displaying a picture corresponding to the process of performing the crossing type action; or controlling, in the virtual scene, the target object to perform the climbing type action, and displaying a picture corresponding to the process of performing the climbing type action.

Optionally, in the process of controlling, in the virtual scene, the target object to perform the target action, a second operation triggered in the client is detected; and in response to the detected second operation, performing of the target action is stopped according to an indication of the second operation. For example, the second operation is to instruct the target object to stop climbing, lying prone on the surface of the obstacle, or standing on the top of the obstacle.

Figure 11:
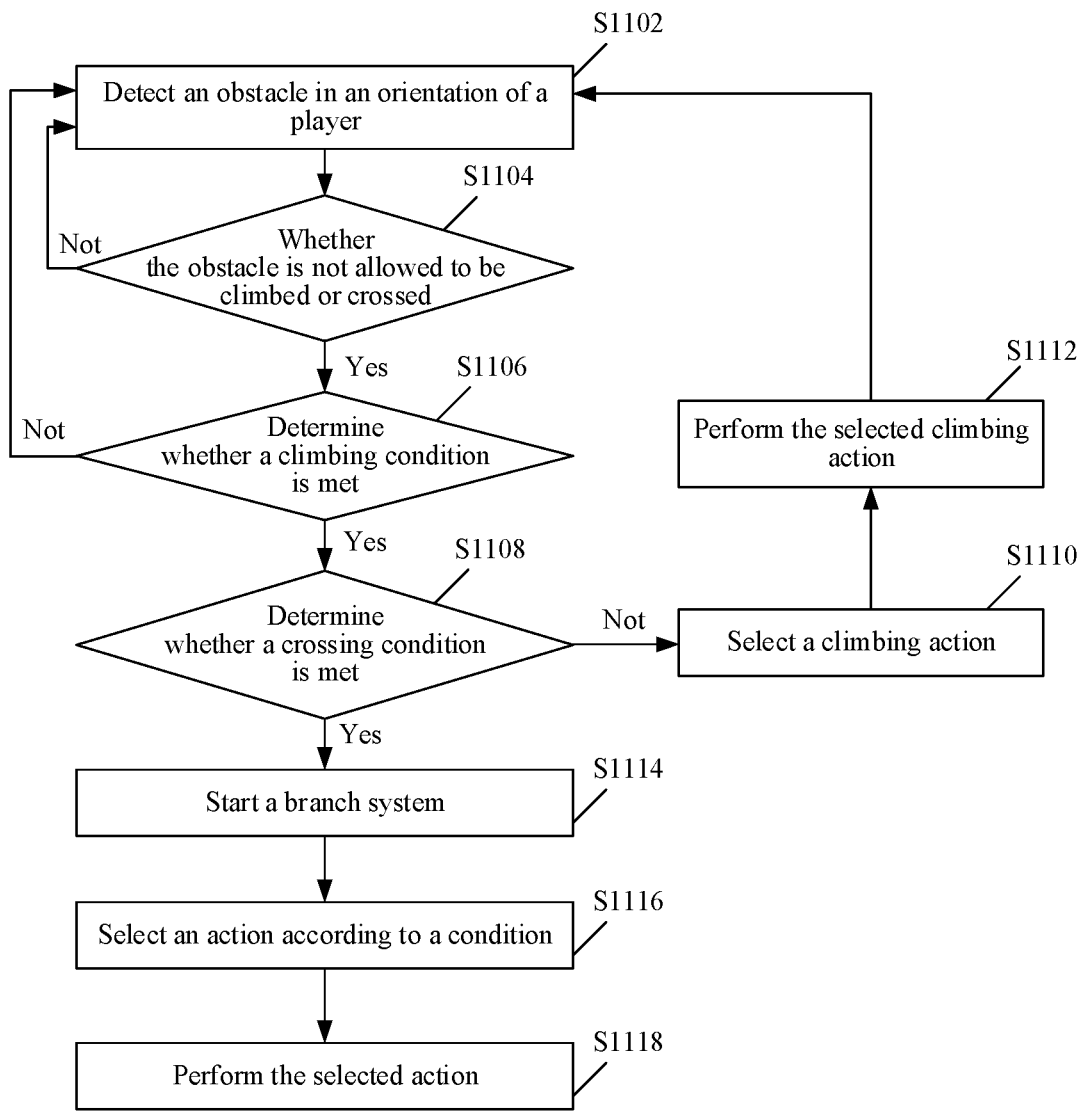
FIG. 11 is a flowchart of another optional object control method according to an embodiment of this application.

In an optional embodiment, descriptions of the embodiments of this application are provided in detail below with reference to a specific example shown in FIG. 11.

Step S1102: Detect an obstacle in an orientation of a player.

Step S1104: Determine whether the obstacle is not allowed to be climbed or crossed, and if yes, perform step S1106; otherwise, go back to step S1102.

Step S1106: Determine whether the obstacle meets a climbing condition, and if yes, perform step S1108; otherwise, go back to step S1102.

Step S1108: Determine whether the obstacle meets a crossing condition, and if yes, perform step S1114; otherwise, perform step S1110.

Step S1110: Select a climbing action.
Step S1112: Perform the selected climbing action.
Step S1114: Start a branch system.
Step S1116: Select an action according to a condition.
Step S1118: Perform the selected action.

Figure 12:
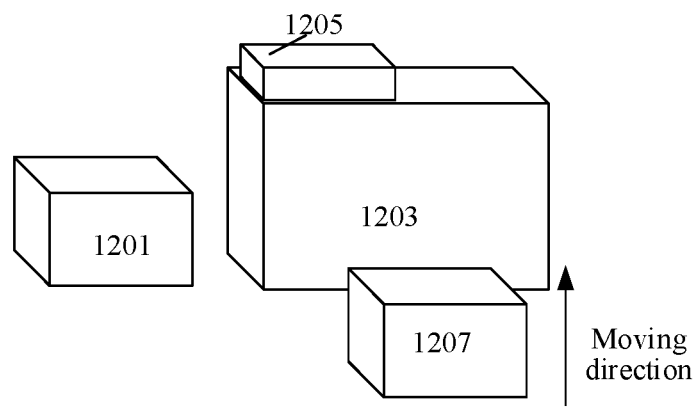
FIG. 12 is a schematic diagram of still another optional obstacle according to an embodiment of this application.

The foregoing steps may be divided into the following several stages:

(1) Function Implementation of an Assistant Determining Body and a Prohibition Determining Body As shown in FIG. 12, for an obstacle 1203, the assistant determining body 1201 may be a triggering volume (trigger volume) without a collision. When a player capsule body is in contact with the assistant determining body 1201, the volume is triggered. In this case, a prohibition determining body detection module is started, and the prohibition determining body detection module generates a detection box 1207 in front of a character. The detection box 1207 moves from a minimum height of the character to a maximum height of the character according to a moving direction shown in FIG. 12. If the detection box 1207 is in contact with the prohibition determining body 1205, information true is returned, and crossing and climbing are not allowed; and if no prohibition determining body is detected, a determining stage of a system is entered.

Figure 13:
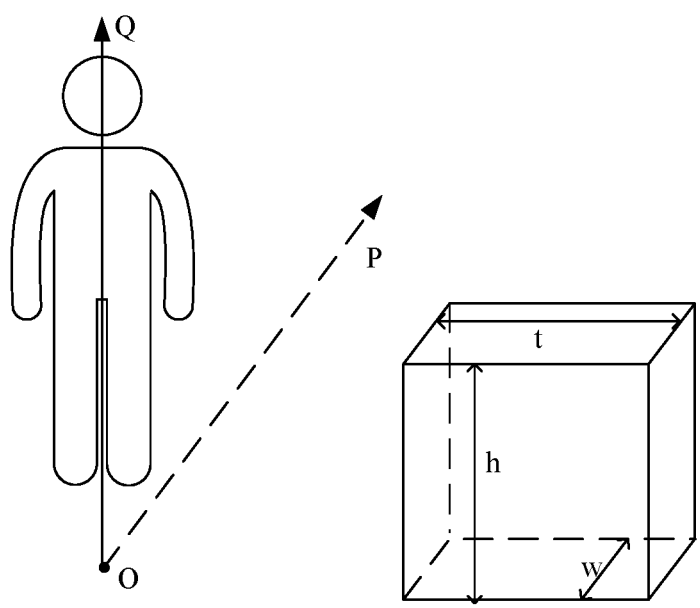
FIG. 13 is a schematic diagram of still another optional obstacle according to an embodiment of this application.

(2) Obtaining of Information about a Height, a Width, and a Thickness (as Shown in FIG. 13)

Height: By using a line Q as a reference, a virtual straight line P perpendicular to an orientation of the character is generated at a position of the minimum height of the character, and an origin O is an intersection between P and Q. If the straight line P is in contact with a collision, information true is returned, and the virtual line P moves upward, until the maximum height of the character object is reached or information false is returned. A height that the virtual line P moves in this period of time, that is, the height h of the obstacle, is recorded.

Width: Similarly, another virtual straight line is generated according to the virtual line P in FIG. 13, and the width t is obtained through scanning from left to right by using a method the same as the method for obtaining the height.

Thickness: Another virtual straight line is generated at a position of a line Q, and an origin is a point higher than a position of a center point of the character. The virtual straight line is moved along a line segment P. When it is detected that a growth spurt greater than a threshold Y occurs in a ray returning length, the time is set as a time node 0; and when a second growth spurt greater than Y is detected, the time is set as a time node 1. Within the time node 0 to the time node 1, a distance moved by the virtual straight line is the thickness w.

(3) Record of Character Statuses, Inertia, and Special Information of Obstacles

The character statuses: A sequence table is set, and the table records UI triggering orders of players. When a status of a player is required, a first UI capable of triggering the status is searched for from a table footer of the sequence table, and a status corresponding to the UI is the status of the player.

Inertia: A speed v of a player and a backpack volume of the player are obtained.

Record of special information: The information is counted into class of the assistant determining body as an attribute, and is stored as a table. Types of the special information are classified by using numbers. When a player triggers the assistant determining body, the table is simultaneously returned, and a processing manner corresponding to a number in the table is performed.

(4) Through-Mold Processing on Actions

A return-to-zero point is set on the assistant determining body. If a center point is excessively far away from the return-to-zero point when a role triggers crossing and climbing, the role is forced to move toward the return-to-zero point by a distance.

In this embodiment of this application, a requirement that a player needs to smoothly get over an obstacle and reach the top of the obstacle in a 3D game is satisfied, and an action can be dynamically adjusted based on a player status, obstacle information, an assistant determining body, and the like, thereby providing more comfortable and smoother experience to the player; and a branch system can further dynamically determine whether the player intends to cross or climb when crossing and climbing are simultaneously satisfied.

The foregoing method embodiments are expressed as a series action combinations for the purpose of brief description, but it is to be understood by a person skilled in the art that because some steps may be performed in other sequences or simultaneously according to the embodiments of this application, the embodiments of this application are not limited to a described action sequence. In addition, it is also to be understood by a person skilled in the art that the embodiments described in the specification are all exemplary embodiments. Therefore, an action and a module involved are not necessarily mandatory in the embodiments of this application.

According to the foregoing descriptions of implementations, a person skilled in the art may clearly learn that the method according to the foregoing embodiments may be implemented by using software and a necessary general hardware platform, or certainly may be implemented by using hardware. However, the former is a better implementation in most cases. Based on such an understanding, the technical solutions in the embodiments of this application essentially or the part contributing to the related technology may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the method described in the embodiments of this application.

Figure 14:
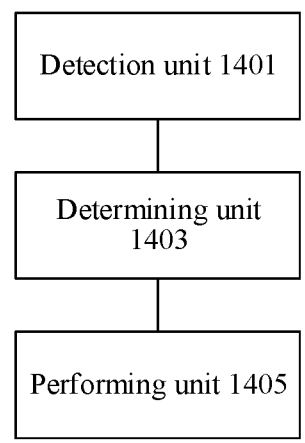
FIG. 14 is a schematic diagram of an optional object control device according to an embodiment of this application.

According to another aspect of the embodiments of this application, an object control device configured to perform the foregoing object control method is further provided. FIG. 14 is a schematic diagram of an optional object control device according to an embodiment of this application. As shown in FIG. 14, the device may include one or more processors, and one or more memories storing program units. The program units are executed by the processors. The program units include a detection unit 1401, a determining unit 1403, and a performing unit 1405.

The detection unit 1401 is configured to detect a first operation triggered in a client, the client displaying a virtual scene, and the first operation being used for instructing a target object in the virtual scene to move from one side of a target obstacle to the other side of the target obstacle.

The determining unit 1403 is configured to determine a target action to be performed by the target object, the target action being determined according to attributes of the target obstacle, and the target action being a crossing type or climbing type action performed by the target object to move from one side of the target obstacle to the other side of the target obstacle.

The performing unit 1405 is configured to control, in the virtual scene, the target object to perform the target action.

The detection unit 1401 in this embodiment may be configured to perform step S202 in the embodiments of this application, the determining unit 1403 in this embodiment may be configured to perform step S204 in the embodiments of this application, and the performing unit 1405 in this embodiment may be configured to perform step S206 in the embodiments of this application.

Implemented examples and application scenarios of the foregoing modules are the same as those of the corresponding steps, but are not limited to the content disclosed by the foregoing embodiments. The foregoing modules, as a part of the device, may run in the hardware environment shown in FIG. 1, and may be implemented by using software or may be implemented by using hardware.

By using the foregoing modules, when the first operation triggered in the client is detected, the action to be performed by the target object, that is, the crossing type or climbing type action performed to move from one side of the target obstacle to the other side of the target obstacle, is determined according to the attributes of the target obstacle; and the target object is controlled in the virtual scene to perform the target action. In other words, in this embodiment of this application, a plurality of operation manners for getting over an obstacle are provided in a virtual scene, and a technical problem of an undiversified operation manner in an encounter of an obstacle in the related art can be resolved, thereby achieving a technical effect of enriching operations in an encounter of an obstacle.

Optionally, the performing unit is further configured to: control, in the virtual scene, the target object to perform the crossing type action, and display a picture corresponding to the process of performing the crossing type action; or control, in the virtual scene, the target object to perform the climbing type action, and display a picture corresponding to the process of performing the climbing type action.

Optionally, the detection unit may further be configured to: in the process of controlling, in the virtual scene, the target object to perform the target action, detect a second operation triggered in the client. The performing unit may further be configured to: in response to the detected second operation and according to an indication of the second operation, stop performing the target action.

The determining unit may further be configured to select the target action from an action set at least according to the attributes of the target obstacle.

The determining unit may further be configured to select the target action from a corresponding action set according to the attributes of the target obstacle and attributes of the target object.

Optionally, the determining unit may include: a first search module, configured to search a plurality of sets for an action set matching the attributes of the target obstacle; and a second search module, configured to search the action set for the target action matching the attributes of the target object.

The first search module may further be configured to search the plurality of sets for an action set matching a height and a thickness of the target obstacle.

Optionally, the first search module may include:

a first obtaining submodule, configured to obtain a thickness between a first point on the target obstacle and a second point on the target obstacle, the first point being a point passed through by the target object in a case that the target object starts to cross the target obstacle by using the crossing type action, and the second point being a point passed through by the target object in a case that the target object gets over the target obstacle by using the crossing type action;

a second obtaining submodule, configured to obtain a distance between a third point and a fourth point on a target parabola, the third point being a point that is on a rise stage of the target parabola and that has the same height as the first point, the fourth point being a point that is on a fall stage of the target parabola and that has the same height as the second point, and the target parabola being a parabola that is formed in a case that the target object crosses the target obstacle by using the crossing type action;

a first search submodule, configured to search, in a case that the thickness between the first point and the second point is not greater than the distance between the third point and the fourth point, the plurality of sets for the action set in which types of included actions are the crossing type; and a second search submodule, configured to search, in a case that the thickness between the first point and the second point is greater than the distance between the third point and the fourth point, the plurality of sets for the action set in which types of included actions are the climbing type.

Optionally, the first search module may include: a first determining submodule, configured to: before the plurality of sets is searched for the action set matching the attributes of the target obstacle, determine the target parabola according to at least one of a speed, inertia and an orientation of the target object.

The second search module may further be configured to search the action set for the target action matching the speed, the inertia, and the orientation of the target object.

Optionally, the second search module may include: a second determining submodule, configured to determine a distance between the target object and the target obstacle and the height of the target obstacle; and a third search submodule, configured to search the action set for the target action according to the distance between the target object and the target obstacle and the height of the target obstacle. Each action in the action set is configured with a distance interval and a height interval; the distance between the target object and the target obstacle is within the distance interval configured for the target action; and the height of the target obstacle is within the height interval configured for the target action.

The device in this embodiment of this application may further include: a display unit, configured to: display, in the client in a case that the target obstacle is allowed to be crossed or climbed, an identifier used for triggering the first operation.

Optionally, the display unit may include: an obtaining module, configured to obtain configuration information of the obstacle in a case that the target object is located in a target area in the virtual scene, where distances between points in the target area and the obstacle are within a target threshold; a first determining module, configured to: in a case that the configuration information indicates that the obstacle is allowed to be crossed or climbed, determine that the obstacle is allowed to be crossed or climbed; and a second determining module, configured to: in a case that the configuration information indicates that the obstacle is not allowed to be crossed or climbed, determine that the obstacle is not allowed to be crossed or climbed.

Implemented examples and application scenarios of the foregoing modules are the same as those of the corresponding steps, but are not limited to the content disclosed by the foregoing embodiments. The foregoing modules, as a part of the device, may run in the hardware environment shown in FIG. 1, and may be implemented by using software or may be implemented by using hardware. The hardware environment includes a network environment.

According to another aspect of the embodiments of this application, an electronic device for implementing the foregoing object control method is further provided. The electronic device may be a server or a terminal.

Figure 15:
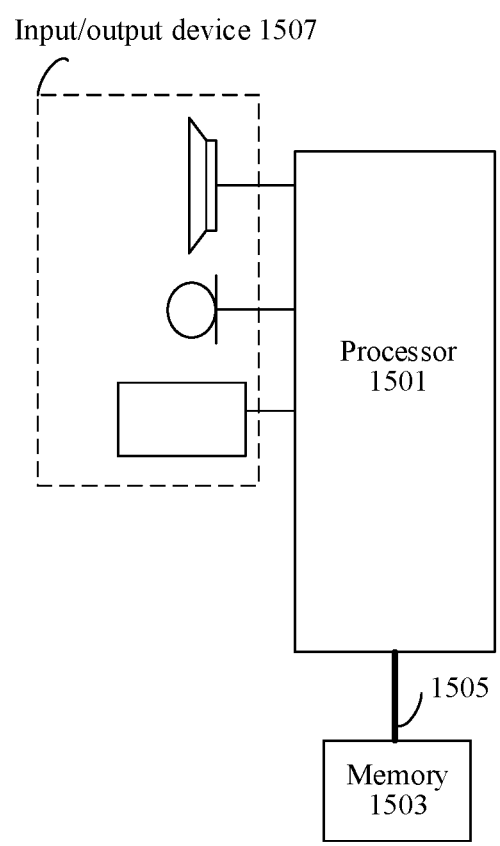
FIG. 15 is a structural block diagram of an electronic device according to an embodiment of this application.

FIG. 15 is a structural block diagram of an electronic device according to an embodiment of this application. Descriptions are provided below by using an example in which the electronic device is a terminal. As shown in FIG. 15, the terminal may include: one or more processors 1501 (only one is shown in FIG. 15), a memory 1503, and a transmission device 1505 (for example, the transmission device in the foregoing embodiments). As shown in FIG. 15, the terminal may further include an input/output device 1507.

The memory 1503 may be configured to store a software program and module, for example, program instructions/modules corresponding to the object control method and device in the embodiments of this application. The processor 1501 runs the software program and module stored in the memory 1503, to implement various functional applications and data processing, that is, implement the foregoing object control method. The memory 1503 may include a high speed random access memory, and may further include a non-volatile memory, for example, one or more magnetic storage devices, a flash memory, or another non-volatile solid-state memory. In some examples, the memory 1503 may further include memories remotely set relative to the processor 1501, and these remote memories may be connected to a terminal through a network. Examples of the network include but are not limited to, the Internet, an intranet, a local area network, a mobile communications network, and a combination thereof.

The transmission device 1505 is configured to receive or transmit data through a network, and may further be configured to perform data transmission between the processor and the memory. Specific examples of the network include a wired network and a wireless network. In an example, the transmission device 1505 includes a network interface controller (NIC), which may be connected to another network device and router through a cable, so as to communicate with the Internet or a local area network. In an example, the transmission device 1505 is a radio frequency (RF) module, and is configured to wirelessly communicate with the Internet.

Specifically, the memory 1503 is configured to store an application program.

The processor 1501 may invoke, by using the transmission device 1505, the application program stored in the memory 1503, to perform the following steps:

detecting a first operation triggered in a client, the client displaying a virtual scene, and the first operation being used for instructing a target object in the virtual scene to move from one side of a target obstacle to the other side of the target obstacle;

determining a target action to be performed by the target object, the target action being determined according to attributes of the target obstacle, and the target action being a crossing type or climbing type action performed by the target object to move from one side of the target obstacle to the other side of the target obstacle; and controlling, in the virtual scene, the target object to perform the target action.

The processor 1501 is further configured to perform the following steps:

obtaining a thickness between a first point on the target obstacle and a second point on the target obstacle, the first point being a point passed through by the target object in a case that the target object starts to cross the target obstacle by using the crossing type action, and the second point being a point passed through by the target object in a case that the target object crosses the target obstacle by using the crossing type action;

obtaining a distance between a third point and a fourth point on a target parabola, the third point being a point that is on a rise stage of the target parabola and that has the same height as the first point, the fourth point being a point that is on a fall stage of the target parabola and that has the same height as the second point, and the target parabola being a parabola that is formed in a case that the target object crosses the target obstacle by using the crossing type action;

searching, in a case that the thickness between the first point and the second point is not greater than the distance between the third point and the fourth point, the plurality of sets for the action set in which types of included actions are the crossing type; and searching, in a case that the thickness between the first point and the second point is greater than the distance between the third point and the fourth point, the plurality of sets for the action set in which types of included actions are the climbing type.

By using this embodiment of this application, a first operation triggered in a client is detected, the client displaying a virtual scene, and the first operation being used for instructing a target object in the virtual scene to move from one side of a target obstacle to the other side of the target obstacle; a target action to be performed by the target object is determined, the target action being determined according to attributes of the target obstacle, and the target action being a crossing type or climbing type action performed by the target object to move from one side of the target obstacle to the other side of the target obstacle; and the target object is controlled in the virtual scene to perform the target action. In other words, in this embodiment of this application, a plurality of operation manners for getting over an obstacle are provided in a virtual scene, and a technical problem of an undiversified operation manner in an encounter of an obstacle in the related art can be resolved, thereby achieving a technical effect of enriching operations in an encounter of an obstacle.

Optionally, for a specific example in this embodiment, reference may be made to the examples described in the foregoing embodiments, and details are not described herein again in this embodiment.

A person of ordinary skill in the art may understand that the structure shown in FIG. 15 is merely exemplary, and the terminal may be a terminal device such as a smartphone (for example, an Android mobile phone and an iOS mobile phone), a tablet computer, a palmtop computer, a mobile Internet device (MID), or a PAD. FIG. 15 does not constitute a limitation on a structure of the foregoing electronic device. For example, the terminal may further include more or less components (for example, a network interface and a display device) than those shown in FIG. 15, or have a configuration different from that shown in FIG. 15.

A person of ordinary skill in the art may understand that all or part of the steps of the methods in the embodiments may be implemented by a program by instructing hardware relevant to a terminal device. The program may be stored in a computer-readable storage medium, and the storage medium may include a flash drive, a read-only memory (ROM), a random access memory (RAM), a magnetic disk, an optical disc, and the like.

An embodiment of this application further provides a storage medium. Optionally, in this embodiment, the storage medium may be configured to execute program code of the object control method.

Optionally, in this embodiment, the storage medium may be located in at least one of a plurality of network devices in the network shown in the foregoing embodiments.

Optionally, in this embodiment, the storage medium is configured to store program code for performing the following steps:

S11: detecting a first operation triggered in a client, the client displaying a virtual scene, and the first operation being used for instructing a target object in the virtual scene to move from one side of a target obstacle to the other side of the target obstacle;

S12: determining a target action to be performed by the target object, the target action being determined according to attributes of the target obstacle, and the target action being a crossing type or climbing type action performed by the target object to move from one side of the target obstacle to the other side of the target obstacle; and S13: controlling, in the virtual scene, the target object to perform the target action.

Optionally, the storage medium is further configured to store program code for performing the following steps:

S21: obtaining a thickness between a first point on the target obstacle and a second point on the target obstacle, the first point being a point passed through by the target object in a case that the target object starts to cross the target obstacle by using the crossing type action, and the second point being a point passed through by the target object in a case that the target object crosses the target obstacle by using the crossing type action;

S22: obtaining a distance between a third point and a fourth point on a target parabola, the third point being a point that is on a rise stage of the target parabola and that has the same height as the first point, the fourth point being a point that is on a fall stage of the target parabola and that has the same height as the second point, and the target parabola being a parabola that is formed in a case that the target object crosses the target obstacle by using the crossing type action;

S23: searching, in a case that the thickness between the first point and the second point is not greater than the distance between the third point and the fourth point, the plurality of sets for the action set in which types of included actions are the crossing type; and S24: searching, in a case that the thickness between the first point and the second point is greater than the distance between the third point and the fourth point, the plurality of sets for the action set in which types of included actions are the climbing type.

Optionally, for a specific example in this embodiment, reference may be made to the examples described in the foregoing embodiments, and details are not described herein again in this embodiment.

Optionally, in this embodiment, the foregoing storage medium may include but is not limited to: any medium that can store program code, such as a USB flash drive, a ROM, a RAM, a removable hard disk, a magnetic disk, or an optical disc.

The sequence numbers of the foregoing embodiments of this application are merely for the convenience of description, and do not imply the preference among the embodiments.

When the integrated unit in the foregoing embodiment is implemented in the form of a software functional unit and sold or used as an independent product, the integrated unit may be stored in the foregoing computer-readable storage medium. Based on such understanding, the technical solutions in the embodiments of this application essentially, or the part contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, the descriptions of the embodiments have their respective focuses. For a part that is not described in detail in an embodiment, reference can be made to related descriptions in other embodiments.

In the several embodiments provided in this application, it is to be understood that the disclosed client may be implemented in other manners. The described device embodiment is merely for illustration purposes. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The above descriptions are merely exemplary implementations of this application, and a person of ordinary skill in the art may further make several modifications and improvements without departing from the principle of the embodiments of this application. All such modifications and improvements are to be construed as falling within the protection scope of the embodiments of this application.

INDUSTRIAL APPLICABILITY

In the embodiments of this application, a plurality of operation manners for getting over an obstacle are provided in a virtual scene, and a technical problem of an undiversified operation manner in an encounter of an obstacle in the related art can be resolved, thereby achieving a technical effect of enriching operations in an encounter of an obstacle.

What is claimed is:

1. An object control method performed at an electronic device having one or more processors and memory storing instructions to be executed by the one or more processors, the method comprising:

displaying a virtual scene using a client running at the electronic device, the virtual scene including a target object facing a target obstacle;

detecting a first operation triggered in the client for instructing the target object to move from one side of the target obstacle to the other side of the target obstacle;

determining a target parabola for the target object according to a speed, an inertia and an orientation of the target object; and determining a target action to be performed by the target object according to attributes of the target obstacle, further comprising:

determining that the target action is a crossing type action performed by the target object to move from one side of the target obstacle to the other side of the target obstacle when a height and a thickness of the target obstacle both satisfy the target parabola;

determining that the target action is a climbing type action performed by the target object to move from one side of the target obstacle to the other side of the target obstacle when at least one of the height and the thickness of the target obstacle does not satisfy the target parabola; and controlling, in the virtual scene, the target object to perform the target action.

2. The method according to claim 1, wherein the controlling, in the virtual scene, the target object to perform the target action comprises:

when the target action is the climbing type action:
dynamically displaying a process of the target object climbing from one side of the target obstacle to the other side of the target obstacle.

3. The method according to claim 1, wherein the controlling, in the virtual scene, the target object to perform the target action comprises:

when the target action is the crossing type action:
dynamically displaying a process of the target object crossing from one side of the target obstacle to the other side of the target obstacle.

4. The method according to claim 1, wherein the method further comprises:

during the process of controlling, in the virtual scene, the target object to perform the target action:
detecting a second operation triggered in the client; and
stopping, in response to the detected second operation and according to an indication of the second operation, performing the target action.

5. The method according to claim 1, wherein the determining a target action to be performed by the target object according to attributes of the target obstacle comprises:

selecting the target action from a corresponding action set according to spatial attributes of the target obstacle and movement attributes of the target object.

6. The method according to claim 5, wherein the spatial attributes of the target obstacle include at least the height and the thickness of the target obstacle and the movement attributes of the target object include at least an initial speed and an initial orientation of the target object to move from one side of the target obstacle to the other side of the target obstacle.

7. The method according to claim 1, wherein the method further comprises:

before detecting the first operation triggered in the client:
obtaining configuration information of the target obstacle when the target object is located within a threshold distance from the target obstacle; and
displaying an identifier for triggering the first operation when the configuration information indicates that the target object is allowed to cross or climb the target object.

8. An electronic device, comprising memory, a processor, and a plurality of computer programs stored in the memory and capable of, when executed on the processor, performing a plurality of operations including:

displaying a virtual scene using a client running at the electronic device, the virtual scene including a target object facing a target obstacle;

detecting a first operation triggered in the client for instructing the target object to move from one side of the target obstacle to the other side of the target obstacle;

determining a target parabola for the target object according to a speed, an inertia and an orientation of the target object; and determining a target action to be performed by the target object according to attributes of the target obstacle, further comprising:

determining that the target action is a crossing type action performed by the target object to move from one side of the target obstacle to the other side of the target obstacle when a height and a thickness of the target obstacle both satisfy the target parabola;

determining that the target action is a climbing type action performed by the target object to move from one side of the target obstacle to the other side of the target obstacle when at least one of the height and the thickness of the target obstacle does not satisfy the target parabola; and controlling, in the virtual scene, the target object to perform the target action.

9. The electronic device according to claim 8, wherein the controlling, in the virtual scene, the target object to perform the target action comprises:

when the target action is the climbing type action:
dynamically displaying a process of the target object climbing from one side of the target obstacle to the other side of the target obstacle.

10. The electronic device according to claim 8, wherein the controlling, in the virtual scene, the target object to perform the target action comprises:

when the target action is the crossing type action:
dynamically displaying a process of the target object crossing from one side of the target obstacle to the other side of the target obstacle.

11. The electronic device according to claim 8, wherein the method further comprises:

during the process of controlling, in the virtual scene, the target object to perform the target action:
detecting a second operation triggered in the client; and
stopping, in response to the detected second operation and according to an indication of the second operation, performing the target action.

12. The electronic device according to claim 8, wherein the determining a target action to be performed by the target object according to attributes of the target obstacle comprises:

selecting the target action from a corresponding action set according to spatial attributes of the target obstacle and movement attributes of the target object.

13. The electronic device according to claim 12, wherein the spatial attributes of the target obstacle include at least the height and the thickness of the target obstacle and the movement attributes of the target object include at least an initial speed and an initial orientation of the target object to move from one side of the target obstacle to the other side of the target obstacle.

14. The electronic device according to claim 8, wherein the method comprises:
   before detecting the first operation triggered in the client:
      obtaining configuration information of the target obstacle when the target object is located within a threshold distance from the target obstacle; and
      displaying an identifier for triggering the first operation when the configuration information indicates that the target object is allowed to cross or climb the target object.

15. A non-transitory computer-readable storage medium, storing computer-readable instructions, the computer-readable instructions, when executed by one or more processors of an electronic device, causing the electronic device to perform operations including:
   displaying a virtual scene using a client running at the electronic device, the virtual scene including a target object facing a target obstacle;
   detecting a first operation triggered in the client for instructing the target object to move from one side of the target obstacle to the other side of the target obstacle;
   determining a target parabola for the target object according to a speed, an inertia and an orientation of the target object; and
   determining a target action to be performed by the target object according to attributes of the target obstacle, further comprising:
      determining that the target action is a crossing type action performed by the target object to move from one side of the target obstacle to the other side of the target obstacle when a height and a thickness of the target obstacle both satisfy the target parabola;
      determining that the target action is a climbing type action performed by the target object to move from one side of the target obstacle to the other side of the target obstacle when at least one of the height and the thickness of the target obstacle does not satisfy the target parabola; and
   controlling, in the virtual scene, the target object to perform the target action.

16. The non-transitory computer-readable storage medium according to claim 15, wherein the controlling, in the virtual scene, the target object to perform the target action comprises:
   when the target action is the climbing type action:
      dynamically displaying a process of the target object climbing from one side of the target obstacle to the other side of the target obstacle.

17. The non-transitory computer-readable storage medium according to claim 15, wherein the controlling, in the virtual scene, the target object to perform the target action comprises:
   when the target action is the crossing type action:
      dynamically displaying a process of the target object crossing from one side of the target obstacle to the other side of the target obstacle.

18. The non-transitory computer-readable storage medium according to claim 15, wherein the method further comprises:
   during the process of controlling, in the virtual scene, the target object to perform the target action:
      detecting a second operation triggered in the client; and
      stopping, in response to the detected second operation and according to an indication of the second operation, performing the target action.

19. The non-transitory computer-readable storage medium according to claim 15, wherein the determining a target action to be performed by the target object according to attributes of the target obstacle comprises:
   selecting the target action from a corresponding action set according to spatial attributes of the target obstacle and movement attributes of the target object.

20. The non-transitory computer-readable storage medium according to claim 15, wherein the method comprises:
   before detecting the first operation triggered in the client:
      obtaining configuration information of the target obstacle when the target object is located within a threshold distance from the target obstacle; and
      displaying an identifier for triggering the first operation when the configuration information indicates that the target object is allowed to cross or climb the target object.

* * * * *